H. B. & M. C. ASHER.
Machine for Cutting Sheet-Metal.

No. 204,415. Patented June 4, 1878.

Witnesses:

Inventors:
Howard B. Asher, Milton C. Asher

UNITED STATES PATENT OFFICE.

HOWARD B. ASHER AND MILTON C. ASHER, OF TRENTON, MISSOURI.

IMPROVEMENT IN MACHINES FOR CUTTING SHEET METAL.

Specification forming part of Letters Patent No. 204,415, dated June 4, 1878; application filed April 1, 1878.

*To all whom it may concern:*

Be it known that we, HOWARD B. ASHER and MILTON C. ASHER, of Trenton, in the county of Grundy and State of Missouri, have invented certain new and useful Improvements in Cutters for Sheet Metal; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention is an improved implement for cutting sheet metal; and has for its object to furnish to the trade a machine, simple of construction, suitable for cutting sheet metal of any thickness, whether in plain sheets or cylindrical, conical, or other irregular form.

Our machine consists in providing, in combination with a circular cutter and a grooved bearing-block, a gage which slides horizontally on ways provided in the upper member of the frame, and extending downward serves as a support to the lower shaft, on which is secured the bearing-block.

The knife-shaft and block-shaft are provided with gear-wheels which mesh into each other to move the knife and grooved block in opposite directions about their axes to draw and cut the metal at the same time.

Figure 1:
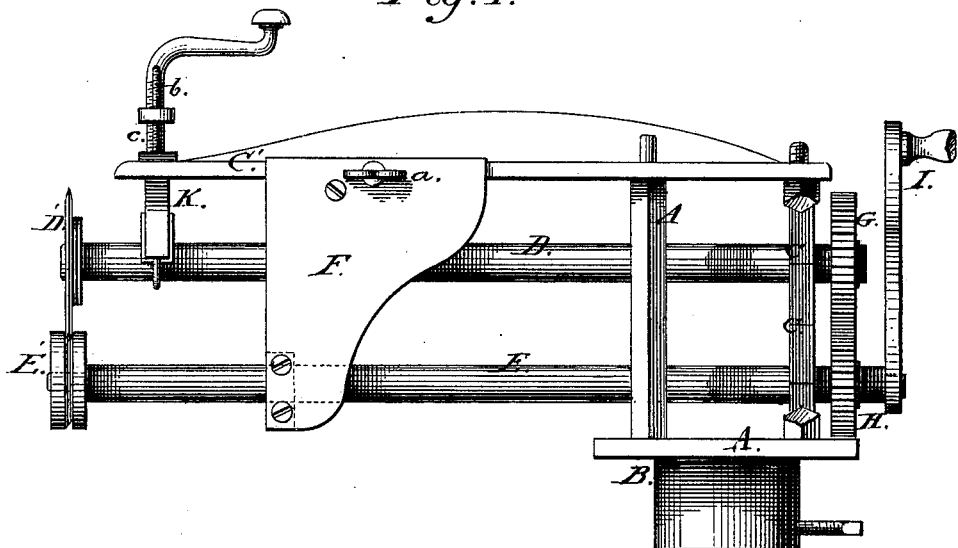
Figure 2:
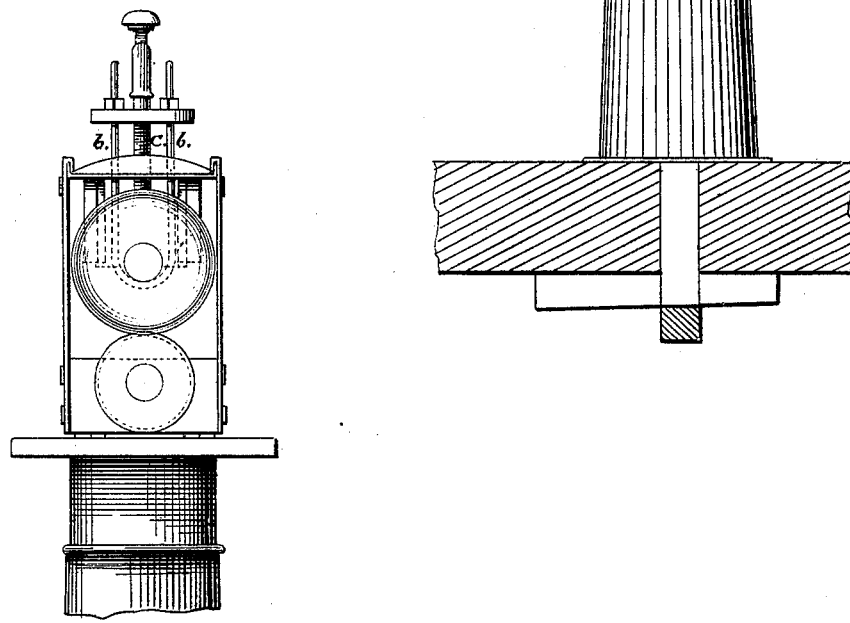

In the accompanying drawings, Figure 1 is a side elevation of our machine. Fig. 2 is an end elevation of the same.

Similar reference letters denote like parts in all of the figures.

A is the frame, which rests on the base B, and has an arm, C′, forming the upper member to support certain features in the machine hereinafter described. Between two posts, which in part compose the frame, are bearings C C, which support the journals of shafts D E. The upper member C′ of frame A has its edges turned up to form flanges or ways for a gage, F, which is supported by and slides upon them. At the bottom of this gage F is a journal-bearing for the shaft E. This gage, which may be moved on said ways longitudinally with the frame, may be secured at given points by a set-screw, *a*.

At the end of the upper member of the frame A is a hanging bearing, K, for the knife-shaft D. This bearing is adjustable vertically on guide-rods *b b*, by means of a screw, *c*, which lifts and lowers the knife-shaft to accommodate the knife to the different thicknesses of sheet metal to be cut.

The gear-wheels G H, which are attached to shafts D E, are of sizes to give the proper relative movement to the rotary knife D′ and block E′, between which the sheet metal passes. A crank, I, on the end of shaft E, in the hands of the operator, furnishes the movement to the rotary knife D′ and grooved cylindrical block E′.

At the base of the frame of the machine is provided a socket, which fits over and is clamped to a standard fixed in the ordinary tinner's bench.

Our device is especially suited to cutting sections from cylinders or cones, such as stove-pipe in fittings, or pans and buckets in general repairing.

Our machine is operated as follows: The screw *c* being moved to lift the knife-shaft D, the cylinder, for instance, to be cut is run in over the cylindrical grooved block E′, and back to the gage F, which has been fixed to its proper adjustment. The rotary knife is now lowered until the metal to be cut is clamped in the groove of the block E′. The crank I, in the hands of the operator, is now moved to impart motion to the gear-wheels, and knife and block forming the cutting device. The rotary knife and grooved block, moving in opposite directions, draw the metal inward, and at the same time make a neat cut.

We are aware that machines are in use with rotary beveled wheels bearing in grooved cylinders to perform the operation of indenting or grooving sheet-metal work, and these, although analogous to ours, in our judgment do not anticipate our invention. Ours is essentially a rotary shear formed to cut sheet metal with great facility and neatness.

We are aware that a patent has been granted by the United States to J. R. Cole, July 11, 1871, No. 116,931, in which is shown a gage of a certain construction, to which we make no claim.

What we claim as our invention, and desire to secure by Letters Patent, is—

In combination with the cutting device, the gage F, sliding on ways formed on the upper member of the frame of the machine, and supporting, in suitable journal-bearings, the shaft E, as and for the purpose set forth.

HOWARD B. ASHER.
MILTON C. ASHER.

Witnesses:
R. W. RIGGS,
THOMAS A. MURPHY.